Jan. 7, 1936.                I. M. TERWILLIGER                2,026,713
                MEANS AND METHOD OF DISPLAYING PICTURES
                        Filed June 18, 1934
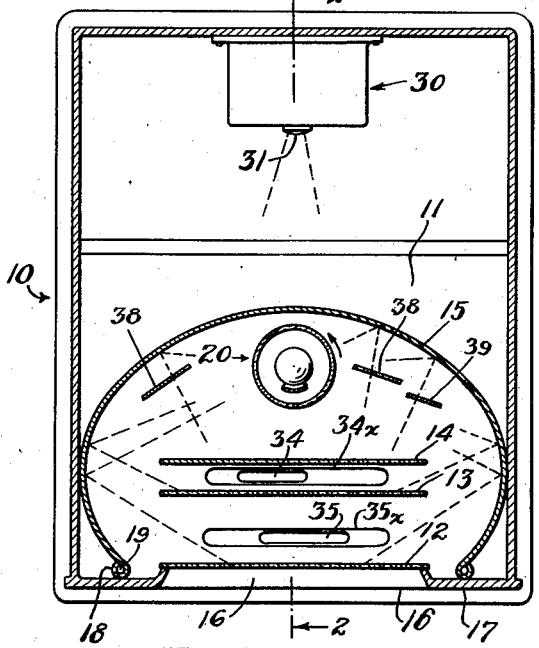
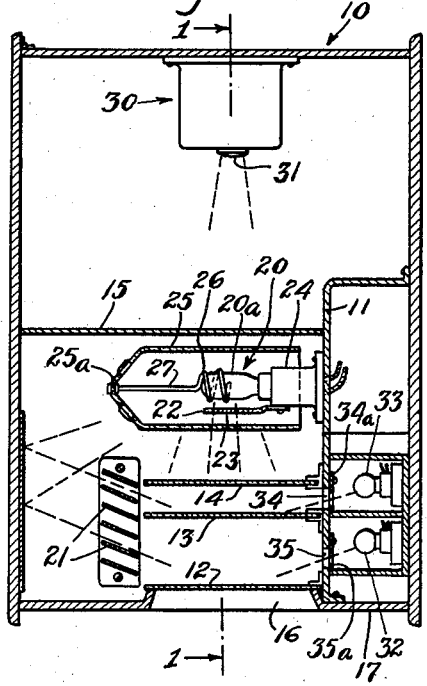
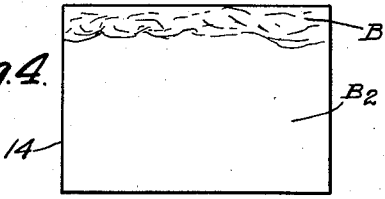
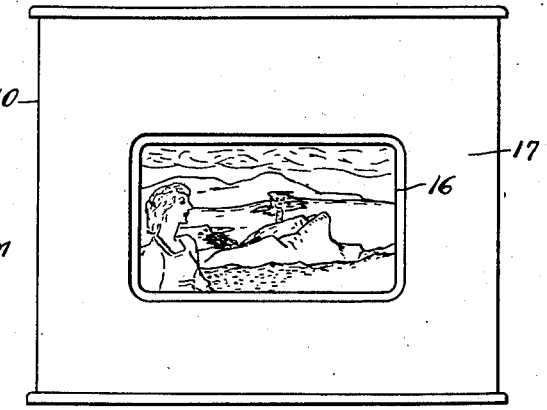
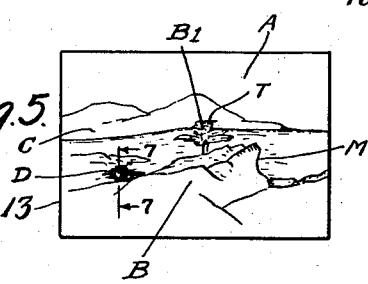
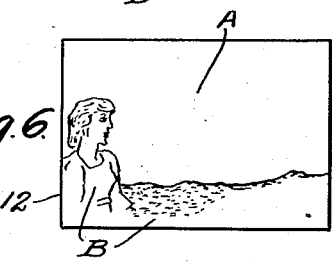
INVENTOR.
Ivan Melville Terwilliger
BY Robt. W. Pearson
ATTORNEYS.

Patented Jan. 7, 1936

2,026,713

UNITED STATES PATENT OFFICE 2,026,713

MEANS AND METHOD OF DISPLAYING PICTURES

Ivan Melville Terwilliger, Altadena, Calif.

Application June 18, 1934, Serial No. 731,077

9 Claims. (Cl. 40—132)

This invention relates to a means for and method of displaying pictures. More specifically defined the invention pertains to the production and display of pictures in a life-like relief and whereby, by an optical illusion, portions of the pictured objects are caused to appear to be possessed of a third dimension.

The invention is capable of reproducing any subject matter that can be photographed and is adapted to be used for a great variety of purposes, for example, education, amusement and advertising. Among its advertising uses may be mentioned the pictorial reproduction of places of interest to travelers to be reached by bus, railroad or steamship; of merchandise or real estate for sale; and as a hotel or theater lobby display of attractions. Any advertising words desired can be exhibited as a part of the picture display.

In its educational aspect the invention may present, among other things, plants and animals, scientific matters requiring illustration, and interesting or celebrated people.

Another object of the invention is to provide a pictorial construction wherein particular pictorial images or groups of images may be added, removed, changed or positioned differently without affecting the general composition of the main picture being displayed.

Still another object is to provide an improved picture assembly wherein a still picture occupies the foreground and a moving picture complementary thereto occupies the background, or the picture in the background may be of an automatically changing character.

Among the meritorious features of the invention may be mentioned the use of color in such a way as to add to the realistic character of the pictures, and to render them more attractive by imparting to them the double novelty of relief effect and either natural or changing color; to give to the pictures a greater brilliancy than is possessed by other pictorial representations wherein transparencies are used; to make foreground objects more conspicuous; to make pictures look better and present a more attractive appearance, thus causing them to hold the attention of observers for a longer period of time; and to provide, in combination with other improved features, means for pictorial representation that can be produced at a relatively low cost and which, owing to its simple construction, can be put into service by the average individual without special technical training.

According to the principles of the invention there may be provided among the picture plates or panels, a plate having areas that are transparent, and areas that are white and not transparent, and areas that are halftones.

The invention also includes the use of a picture plate or film in different degrees of transparency and having other areas in differing degrees of transparency that do not necessarily correspond to the differing degrees of translucency in the photographic emulsion, or, a method of control whereby the transparency of the film or plate does not depend upon the translucency of the photographic emulsion.

Various other uses, objects and advantages may hereinafter appear.

Referring to the accompanying drawing, which illustrates what is at present deemed to be a preferred embodiment of the invention, Fig. 1 is a horizontal section on line 1—1 of Fig. 2.

Fig. 2 is a vertical section on line 2—2 of Fig. 1.

Fig. 3 is a front elevation.

Figs. 4, 5 and 6 are respectively views of the rear, middle and front picture panels.

Fig. 7 is a sectional view taken on line 7—7 of Fig. 5.

Referring in detail to the drawing, a cabinet 10 is provided with a supporting plate 11, to which are attached and from which project, in parallel spaced relation to each other, a plurality of picture panels or plates, those shown in the drawing consisting of a front panel 12, a middle panel 13 and a rear panel 14. The front picture plates or panels are spaced farther apart than the back ones.

Within the cabinet 10 is shown a removable light and color reflecting plate 15 which is straight throughout its length but is concavo-convex from side to side. The open side of this plate spans a window opening 16 through the front wall 17 of the cabinet 10. Said plate 15 may be of sheet metal and is colored with white or any color or combination of colors which it is desired to reflect into the picture. Said plate may have slightly curled front edge portions 18 which detachably engage fixed rods 19 to keep the inserted plate in place.

In the back part of the space embraced by the curved plate 15 is a lamp or other source of light 20 which is positioned to direct light through the picture panels 14, 13 and 12 and is also positioned to direct light against the inner side of the plate 15 thence to be reflected against the back side of each of the aforesaid three picture panels. In order to cause the light thus reflected to illuminate the backs only of the individual picture panels the series of light guard plates 21 is provided. Said light guards are opaque plates which are mounted in spaced relation to each other as shown, being supported within the cabinet in any suitable manner not shown in detail.

In front of the lamp 20 is a light modifying plate 22 having a dimming or light diffusing area 23, said plate being attached to the lamp base 24.

In Figs. 1 and 2 is shown a color-changing drum 25 of any desired character which is rotatably supported around the lamp globe 20a by a rod 27, said rod having a coiled lower end portion 26 which grips the lamp globe 20a. The upper end of the drum is shown having a seat 25a to receive the top of the rod 27.

When desired, the curved plate 15 together with the lamp 20 and its accessories may be removed leaving an unobstructed passage for the light from a rear lamp assembly 30 having a projection lense 31, which projects an image brought into focus upon the picture plate 14. This image may be produced either by a still slide or from a moving picture. Or, if it is not desired to project any kind of a focused image, the lens 31 may be used to project colors on and through the plates 14, 13 and 12.

The housing for the plates or films used in the apparatus may be set into a wall, or a machine or billboard construction, or may be mounted apart from these or other accessories.

Below the front of the plate or permanent floor 11 shown in Figs. 1 and 2 are front lamps 32 and rear lamps 33 positioned to direct light through openings 34 and 35 to furnish additional illumination of the backs of the picture panels and to prevent the projection of shadows from plate 14 on to plate 13 and from plate 13 onto plate 12.

In assembling and using the apparatus it is to be borne in mind that picture plates processed in such a manner as to locally affect their transparency may be used for the two front plates, but such processing is valueless unless said plates are individually mounted in spaced relation to the plate next behind, for when such plate is brought too close to the plate next behind the obscuring effect disappears. The picture is spoiled if the observer can see, through the light diffusion area, images on the plates behind, for this will cause a double image or so called "ghost" effect. The arrangement must be such that the observer's vision cannot penetrate beyond the rearmost picture plane, or light diffusion plate.

Figs. 4, 5 and 6 show individually three plates which may be combined as in Figs. 1 and 2 to produce a typical assembly for the production of the composite picture shown in Fig. 3. Another picture combination usable with this device is a composite relief picture having as one of the picture plates an opaque picture of any kind, such as a photograph or a printed sheet. This is assembled in spaced relation behind one or more of the transparent picture panels and is illuminated by reflection. In order to illuminate the face of the rearmost picture plane, the light-masking plates 21 are adjusted at the required angle. The total appearance of the picture is the same with the exception that the terminal picture plane farthest away is opaque rather than being transparent. The picture panel or panels in front are the same as previously described.

Another attractive combination in color effect is produced by positioning the terminal of vision at the position of plate 13 and making plate 14 an assembly of variegated transparent color tissues or gelatines of any desired form or shape. The light from source 20 projects the colors of drum 25 and of said plate 14 forwardly onto plate 13 in local areas. This is not for the purpose of creating movement or to project shadows, but for pure color. The light diffusing area, which is the same as the terminal plane 13, blends these colors and diffuses the broken edges where the gelatines overlie each other. The individual picture plates shown in Figs. 4, 5 and 6 are placed in a front to rear series in spaced relations to each other thereby creating a composite relief picture having harmonious images and a natural appearance, in which the images of Fig. 6 stand out in advance of Fig. 5, and in which some of the images of Fig. 5 stand out in advance of the background provided by Fig. 4. Also reflected light from the source 20 passes between the guard plates 21, being thus directed upon the back faces only of the plates 12 and 13. By this arrangement a smaller area of reflected light from said source is thrown upon the rearmost plate than upon the two front ones, thus providing an equalization of light upon the front plate regardless of the opacity of the background plate at the rear, which is an advantage.

The invention, considered as a method will be more clearly understood by a consideration of the means shown in Figs. 4, 5 and 6 to control the translucency and transparency of various parts of the three cooperating picture plates individually shown in these views.

With respect to transparency and translucency these plates are provided with areas lettered and defined as follows:

The areas A are entirely transparent and hence are, of course, translucent also. Areas of this kind are designated only in the portions of plates 12 and 13.

The areas B are translucent, but they are not transparent and therefore terminate visibility. The pictorial representations on plate 12 occupy such an area. In plate 13, B designates the area covered by the rocky mound M upon which the tree T is represented as growing. The area occupied by the tree itself, being more nearly opaque, is designated B1. In Fig. 4, the cloud shown in the upper portion of the plate occupies one of the B areas. The area below the cloud is designated B2 because, though it is also a non-transparent area in one sense it does not terminate visibility, for it is behind a plate area which has already cut off visibility.

The area C, like halftones, partly cuts off light and visibility. The portion of plate 13 occupied by the hill shown behind the tree is a C area.

D represents (in Fig. 5 only) a white area, picturing a breaking wave. This area is translucent but not transparent and therefore terminates visibility.

The spacing of the picture plates would be of little value without the processing, it would work in a measure with certain types of picture combinations only.

The picture plates are processed either individually or in a matched set so that they differ from all other picture plates by having a light diffusion area artificially created at the back, or on the area of those particular images which are to stand in relief, and this light diffusion area in a general way follows the contour of the images, and is omitted from parts of the picture which the eye is to penetrate.

The light diffusion planes are put into the picture by grinding, or spraying, or by matching up light diffusing gelatine cutouts.

In quantity production a stencil mask is made to protect the clear areas and the plates or films are either run under a burnishing wheel or sprayed with some substance such as ground glass substitute.

In hand-grinding the back, using substance as steel wool, the line of demarkation between diffused areas made impenetrable to vision and areas which vision penetrates is in some cases abrupt and sharp, and in others is gradually tapered off so that vision gradually recedes from one plane to another. This is in accord with the subject matter of the picture.

The combined processing and spacing causes the vision to penetrate parts of the stereoplane film and terminate on other parts. It creates transparent visibility of multiple planes and prevents the back pictures showing through the "solid" images at the front.

Other processing occasionally desirable is that the images of main or foreground objects are intensified to be stronger and/or sharper than images of other objects. This is accomplished by making that part of the front casing wall 17, which surrounds the window 16, form an opaque mask border which surrounds the foremost picture plate, thereby reducing the visible area of said plate and also, to a less extent, reducing the visible area of the next picture plate towards the rear.

In making complementary sets of films another form of processing consists in blanking out areas of the back planes, which blank areas occur hidden behind foreground images, for the purpose of causing a greater amount of light to strike the front film images, and prevent light eclipse. The area B2 of Fig. 4 is formed in this manner. Light eclipse is also prevented by regulated illumination between planes. Process prints on cellophane in matched sets can be substituted for the picture plates or films if desired.

It should be noted that some of the areas of one picture plane are made to appear to run into and blend with the picture plane next behind, as for example, area C of Fig. 5 in which the vision partly penetrates the halftone image and in effect projects the contour and image of the mountain off from plane 13 where it actually is located farther toward plane 14 where is appears to rest as by an optical illusion.

Since the light diffusion processing on the films is of kindred nature to the light diffusion terminal plane (ground glass, flash opal, silk screen or the like) it blends with the assembly of items and becomes unnoticed. In the unprocessed half tones the light rays fuse the images of the different films and the eye of the observer projects the faint images onto the back glass where they appear to rest by optical illusion.

The visible length and breadth of the front plane is made smaller than of the planes farther back to allow for the divergence of vision without seeing the supporting sides of plate or film holders.

Although previous to my invention changeable colors have been used upon pictures in numerous instances, yet so far as I am aware, the present invention is the first to project changing colors in the lighting simultaneously upon various fixed colors in the translucent picture plates. It is also novel to provide a method or means for changing the color projected upon a single picture plane independent of other parts of the picture assembly.

There is practically no limitation to the size of the pictures which may be assembled in large sizes in strips as, for example, when they are used in billboard advertising. The distance of separation between the respective picture plates 12, 13 and 14 is proportionate to the size of the picture and the subject matter portrayed. The pictures may be stretched or hung on rollers or racks, or can be cemented on the backs of glass plates.

Referring to additional details of construction, the light openings 34 and 35 are formed in adjustable plates 34a and 35a (see Fig. 2) in order that the spots of light admitted through them may be varied in position as indicated in Fig. 1. The plate or wall 11 which supports said adjustable plates, is furnished with openings or slots 34x and 35x sufficiently large to permit this adjustment.

In Fig. 7 is shown a fragment of one of the picture panels, for example the middle panel 13, having a spot 13s wherein is illustrated, to an exaggerated degree, the effect of grinding a small area to produce a roughened surface which will be non-transparent but will produce a whitish, translucent area to give a relief effect to a correspondingly shaped picture object in front of it. In this view the picture-bearing panel or film is designated 13f.

If desired, translucent color plates 38 and 39 may be removably mounted as shown in Fig. 1, said plates being used to color portions of the picture as desired whether the curved reflecting plate 15 is used or the light is furnished by the rear lamp 30. Said plates may be made of glass or films and are so positioned that at least part of the light reflected from the plate 15 or furnished by the lamp assembly 30 passes through them on its way to the picture.

By this invention a translucent picture plate, for example the plate 13, bearing images fixed in various complementary colors, is combined with means including color plates 38 and 39 to produce the recurrent projection upon said plate from the rear thereof of predetermined colors whereby the colors on said plate are recurrently intensified and changed in differing degrees by their various and different intermingling with said projected colors.

I claim:

1. In a picture display apparatus, a series of translucent picture panels representing a natural scene arranged in a front to rear spaced relationship, and means to project predetermined colors upon the rear surface of an individual panel intermediate of other panels of the series to vary independently of the others the color observable on such panel, whereby a locally colored background effect may be produced in the picture.

2. In a composite relief picture, a picture plate having translucent areas which are occupied by pictures or pictorial images and other areas which are transparent, said plate being set in an advanced spaced relationship to a complementary background picture plate, the first recited picture plate having a light diffusing area artificially created on it and in register with an image thereupon whereby the degree of transparency of said image is decreased.

3. In a picture display means, in combination, a plurality of translucent picture panels arranged in a front to rear spaced relationship, a source of light behind all of said plates directing a part of its light forwardly through them, and means to reflect another part of the light from said source around the rearmost plate and upon a plate in advance of said rearmost plate.

4. In a picture display means, in combination, a plurality of translucent picture panels arranged in a front to rear spaced relationship, a source of light behind all of said plates directing a part of its light forwardly through them, means to reflect another part of the light from said source obliquely in between said plates, and a series of guard plates inclined with relation to said picture plates and positioned to cause the reflected light to be directed upon the rear faces only of picture plates in advance of the rearmost plate.

5. In a picture display means, in combination, a plurality of translucent picture panels arranged in a front to rear spaced relationship, and regulatable lighting means to introduce light between said plates in a lateral manner, said lighting means including a source of light, a wall having a relatively large slot therethrough and a plate having a smaller slot alined with and included within said large slot whereby a spot of light may be directed from said source of light to the desired part of an adjacent picture panel.

6. A composite relief picture means comprising a translucent transparent picture plate, at least partially visible, complementary, background means located rearwardly of said plate and forming a partially transparent light dimming area created in conjunction with a local image upon said plate whereby the degree of transparency of said area is decreased, said light dimming area following in a general way the area of said image and gradually tapering off by decreasing density along one at least of its limits, thereby causing a part of said front picture image to appear harmoniously fused by optical illusion with the more distant diffusing background.

7. In a composite relief picture apparatus, a plate having on it a foreground image, means decreasing the transparency of a foreground image by having a light diffusion area artificially created behind said image, said image being fixed upon a translucent transparent picture film set in advanced spaced relationship to an at least partially visible, complementary, background, a portion of the thickness of said forward spaced film behind said image being ground away.

8. A composite relief picture consisting of a picture plate, parts of which are translucent and other parts of which are transparent in spaced relationship in advance of a light diffusing picture plate bearing differing images complementary to the images on the first recited plate, said images on the rear plate being partially eliminated in portions behind images on the other plate, which background eliminations are hidden behind foreground images.

9. In an apparatus of the kind described representing natural scenes, color screens, a translucent picture plate bearing images in various colors, and means to project thereon from the rear predetermined colors whereby the first recited colors are in places intensified and thereby changed to the degree desired by the intermingling and blending with them of said projected colors, said color projecting means comprising a lamp and reflecting means associated therewith whereby some of the projections are made directly upon said translucent plate while others are reflected and then passed through said color screens and thence on to said plate.

IVAN MELVILLE TERWILLIGER.